United States Patent [19]

Schmitz et al.

[11] Patent Number: 5,145,068

[45] Date of Patent: * Sep. 8, 1992

[54] CASSETTE ALBUM WITH CHANNEL-FORM HINGES AND METHOD

[75] Inventors: Stephen R. Schmitz, Shakopee; Philip K. Sykes, Shoreview; Breck J. Johnson, Mankato, all of Minn.

[73] Assignee: Blackbourn Inc., Eden Prairie, Minn.

[*] Notice: The portion of the term of this patent subsequent to Oct. 30, 2007 has been disclaimed.

[21] Appl. No.: 585,605

[22] Filed: Sep. 20, 1990

Related U.S. Application Data

[63] Continuation-in-part of Ser. No. 436,453, Nov. 14, 1989, Pat. No. 4,966,283.

[51] Int. Cl.$^5$ .............................................. B65D 73/00
[52] U.S. Cl. .................................... 206/472; 206/312; 206/387; 220/339
[58] Field of Search ................ 206/309, 311, 312, 387, 206/444, 472; 220/337, 339

[56] References Cited

U.S. PATENT DOCUMENTS

| | | | |
|---|---|---|---|
| 3,351,270 | 11/1967 | Hohnjec | 220/337 |
| 3,616,487 | 11/1971 | Dearth | 220/337 |
| 3,629,901 | 12/1971 | Wolf | 220/339 |
| 4,341,307 | 7/1982 | Shyers | 206/387 |
| 4,432,827 | 2/1984 | Graets | 156/245 |
| 4,501,361 | 2/1985 | Rose, Jr. | 206/493 |
| 4,635,797 | 1/1987 | Bankier | 206/472 |
| 4,641,750 | 2/1987 | Johnson et al. | 206/472 |
| 4,681,223 | 7/1987 | Roberts | 220/339 |
| 4,703,853 | 11/1987 | Byrns | 206/387 |
| 4,717,021 | 1/1988 | Ditzig | 206/472 |
| 4,718,550 | 1/1988 | Johnson | 206/472 |
| 4,724,957 | 2/1988 | Burgschweiger | 206/472 |
| 4,778,051 | 10/1988 | Schaub et al. | 206/472 |
| 4,784,264 | 11/1988 | Sykes | 206/387 |
| 4,966,283 | 10/1990 | Sykes et al. | 206/312 |

FOREIGN PATENT DOCUMENTS

| | | | |
|---|---|---|---|
| 3230987 | 2/1984 | Fed. Rep. of Germany | 206/387 |
| 2503667 | 10/1982 | France | 206/387 |
| 2586498 | 2/1987 | France | 206/387 |
| 2091692 | 8/1982 | United Kingdom | 206/387 |

*Primary Examiner*—David T. Fidei
*Attorney, Agent, or Firm*—James V. Harmon

[57] ABSTRACT

The invention provides a vacuum formed cassette album having front and rear covers connected by a spine. The covers and spine are formed from a stiff, self-supporting thermoformed tray sheet extending the height and breadth of both the front and rear covers and across the spine area. A soft cover sheet, formed for example from supple plastic, is sealed to the tray sheet along its edges. A pair of parallel, vertically disposed, laterally spaced apart vacuum formed channel-form hinges are provided in the tray sheet at the edges of the spine and extending to the top and bottom edges of the tray sheet to define fold lines between the spine and the covers. The channel-form hinges are substantially uncompressed and are of uniform thickness throughout. Between the channels in the spine area is an elevated rectangular plateau defining a box-like frame to help keep the spine flat. One cover has tabs that extend into recesses within the other cover.

8 Claims, 5 Drawing Sheets

```
┌─────────────────────────────────┐
│ PROVIDE STIFF SELF SUPPORTING   │
│ PLASTIC TRAY SHEET              │
└─────────────────────────────────┘
                │
┌─────────────────────────────────┐
│ HEAT TRAY SHEET UNIFORMLY       │
│ TO RENDER THERMOFORMABLE        │
└─────────────────────────────────┘
                │
┌─────────────────────────────────┐
│ PROVIDE PARALLEL FORMING CHANNELS│
│ CORRESPONDING TO POSITION OF    │
│ ALBUM SPINE EDGES               │
└─────────────────────────────────┘
                │
┌─────────────────────────────────┐
│ DRAW SHEET INTO CHANNELS BY     │
│ APPLYING VACUUM WITHIN CHANNELS │
└─────────────────────────────────┘
                │
┌─────────────────────────────────┐
│ SEAL SOFT SUPPLE COVER STOCK    │
│ SHEET TO EDGES OF TRAY SHEET    │
└─────────────────────────────────┘
```

FIG. 9

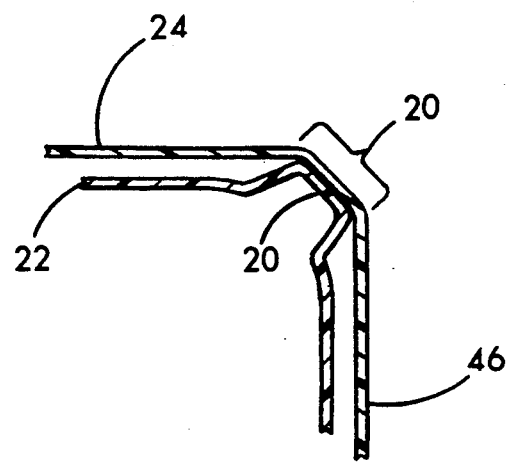

FIG. 10

CASSETTE ALBUM WITH CHANNEL-FORM HINGES AND METHOD

This is a continuation-in-part of a prior application Ser. No. 436,453 filed Nov. 14, 1989, U.S. Pat. No. 4,966,283 bearing the same title.

FIELD OF THE INVENTION

The invention relates to a book-style album and more particularly to an album formed from plastic material.

BACKGROUND OF THE INVENTION

Attempts have been made previously to improve the life of the hinges of book-style cassette albums. For example, U.S. Pat. No. 4,407,410 describes an album having a spine which is curved so as to bow outwardly providing a rounded back. No hinges are formed at the edges of the spine. The rounded backs, however, are thought by many to present a poor appearance.

One objective of the present invention is to provide a tailored, straight back; i.e., a flat, neat looking spine having well defined corners where the edges of the spine intersect the front and rear album covers. This configuration presents a clean, tailored look with good visual appeal and an appearance more similar to that of an ordinary book. A flat spine also presents graphic material more clearly than a round back which distorts the image.

Other prior designs such as those described in U.S. Pat. Nos. 4,641,750; 4,718,550 and 4,784,264 provide a flat spine having a good appearance but the hinges, while usually satisfactory, sometimes crack or split. Occasionally, there are complaints about the hinges breaking, particularly if the album is subject to heavy use. In these albums the hinge is formed by pressure exerted against the sheets with a pair of vertically heated bars. When the bars are pressed together on opposite sides of the plastic sheet material, two laterally spaced apart thermally heated hinge rules are formed which define narrow depressions or longitudinal notches in the sheet material. Each spine rule thus comprises a narrow groove or recess of reduced thickness with a raised border of greater thickness on each side as shown in FIG. 5 of U.S. Pat. No. 4,641,750. Such spine rules form a weak point where breakage can occur.

Another difficulty with some of the prior albums is their tendency to pop open prematurely because of residual stresses in the hinges which act as springs tending to open the album. Moreover, the process used in preparing spine rules previously employed also has a tendency to limit production rates.

The prior application Ser. No. 436,453 and other albums of that kind, while very good, have a weak point; they tend to buckle or collapse when a force is applied to the album which presses the covers toward one another. Another problem in prior albums is the tendency for the spine to bow outwardly so as to destroy the clean lines and the desired flatness in the spine area.

U.S. Pat. No. 4,635,797 describes a package having two separate trays which are spaced apart from one another in the spine area. The vinyl coated paperboard cover stock material is provided with a pair of embossments to define hinges. Both trays have to be formed, handled and sealed to the cover stock material separately, tending to slow production. It is an object of the present invention to provide an album suited for rapid mass production while providing the strength advantage of having a strong, relatively stiff and durable tray stock material extending through the hinges in the spine area. It is also an object to provide the hinges in the stiff and durable tray material rather than in the relatively soft cover stock material and to conform the soft cover layer over the hinges of the inner tray sheet to provide smooth tailored corners at the fold lines between the spine and the covers of the album.

In view of these deficiencies, it is a major objective of the invention to find a way to provide durable, crack resistant hinges in a strong inner tray sheet layer. It is another object to provide an album with a soft and supple outer cover stock layer conforming to the relatively firm inner supporting hinges so as to provide square corners along each edge of the spine. Another object is to provide better flexibility of the hinges with less residual stress in the hinge area when the album is in the closed position. A further object is to find a way to increase production rates, thereby lowering manufacturing costs. A further object is to hold cardboard inserts in place without the provision of a spine rule. Another object is to strengthen and rigidify the spine and keep the spine flat without the necessity of using a piece of cardboard for spine reinforcement.

These and other more detailed and specific objects of the present invention will be apparent in view of the following description setting forth by way of example but one of the various forms of the invention that will be apparent to those skilled in the art once the principles described herein are understood.

THE FIGURES

FIG. 9 is a flow chart illustrating the steps in forming an album in accordance with the invention;

FIG. 10 is a cross-sectional view taken on line 10—10 of FIG. 2 on an enlarged scale;

SUMMARY OF THE INVENTION

The invention provides a vacuum formed cassette album having front and rear covers connected by a spine. The album is formed from an inner stiff, self-supporting thermoformed tray sheet extending the height and breadth of both the front and rear covers and across the spine area. A soft, supple cover sheet, formed from soft non-selfsupporting plastic film or sheet material, is sealed to the tray sheet along its edges. At least a pair of parallel, vertically disposed, laterally spaced apart channel-form hinges are provided are formed in the tray sheet at the edges of the spine and extend to the top and bottom edges of the tray sheet to define fold lines between the spine and the covers. The channel-form hinges are uncompressed and are therefore of uniform thickness throughout and of substantially the same thickness as the surrounding material of the tray sheet. Between the channel-form hinges is an elevated rectangular plateau defining a centrally located box-like frame aligned in the spine area to help keep the spine flat. In a preferred form of the invention, one cover is provided with projecting tabs that extend into finger-access recesses in the wall of a cassette receiving pocket provided in the opposite cover. When the album is closed, the soft cover stock layer conforms smoothly around the outside of the underlying channel-form hinges therey enclosing them to present a neat, tailored appearance.

DETAILED DESCRIPTION OF THE INVENTION

Figure 1:
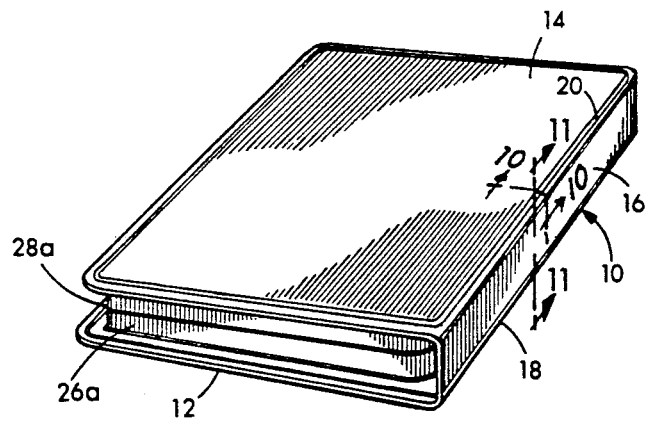
FIG. 1 is a perspective view of an album embodying the invention.
Figure 2:
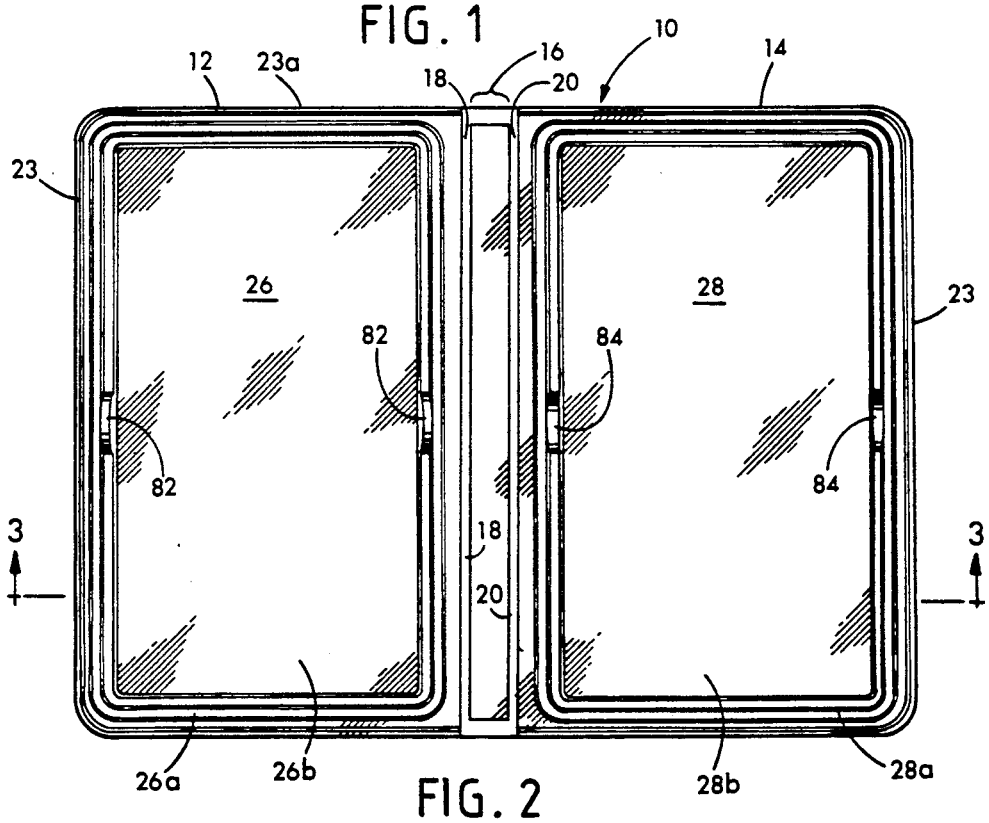
FIG. 2 is an open plan view of the inside of the album on a larger scale than FIG. 1.
Figure 3:
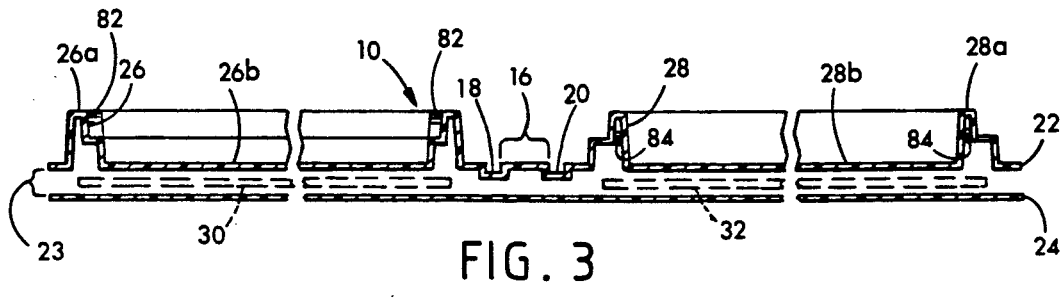
FIG. 3 is an exploded vertical cross-sectional view taken on line 3—3 of FIG. 2.

Shown in FIGS. 1–4 is an album 10 having front and rear covers 12 and 14 joined together by means of spine 16. Fold lines or hinges 18 and 20 are provided at the intersection of spine 16 and the covers. As shown in FIG. 3, the album 10 is formed from two major plastic components. The first is an upper tray sheet 22 of relatively stiff plastic material having little if any plasticizer, for example 0.02 inch thick unplasticized polyvinylchloride sheet which is thermoformed, e.g. by vacuum and/or pressure forming. There is in addition a second, outer sheet 24 of the same general size and outline as sheet 22. The outer cover sheet 24 and tray sheet 22 are bonded together at their edges by a thermal bond, i.e. by forcing the edges thereof together under heat and pressure along a seal 23 extending around the top, sides and bottom of the tray sheet 22. The cover sheet 24 is formed from a soft, supple, non-self-supporting plastic sheet material such as a relatively highly plasticized and conformable polyvinylchloride 0.008 inch thick sheet material which can be referred to as a flexible cover stock. When folded, it will easily conform to the contours of the relatively stiff inner tray sheet 22 which acts as a stiffening member or backing for the cover sheet 24 to present a neat, tailored appearance at and between the hinges 18, 20. If desired, the periphery can be left unsealed at 23a along its upper edge (FIG. 2) to provide a pocket or trap into which a printed display or title sheet (not shown) is inserted when required.

As seen in FIGS. 2–5, the tray sheet 22 is formed into a desired configuration, preferably by thermoforming (e.g. by vacuum and/or pressure forming), to define a pair of left and right cooperating and interfitting cassette receiving trays 26 and 28. Tray 26 includes a rectangular tray wall 26a surrounding a rectangular pocket 26b. Similarly, the tray 28 includes a tray wall 28a of rectangular shape surrounding a pocket 28b adapted to mate within the tray wall 26a when the album is closed. Between the trays and the cover sheet 24 can be provided cardboard stiffening sheets 30 and 32 (FIG. 3). It can be seen in FIG. 3 that the hinges at 18 and 20 will also function to help hold the cardboard stiffening sheets 30, 32 in place.

Figure 4:
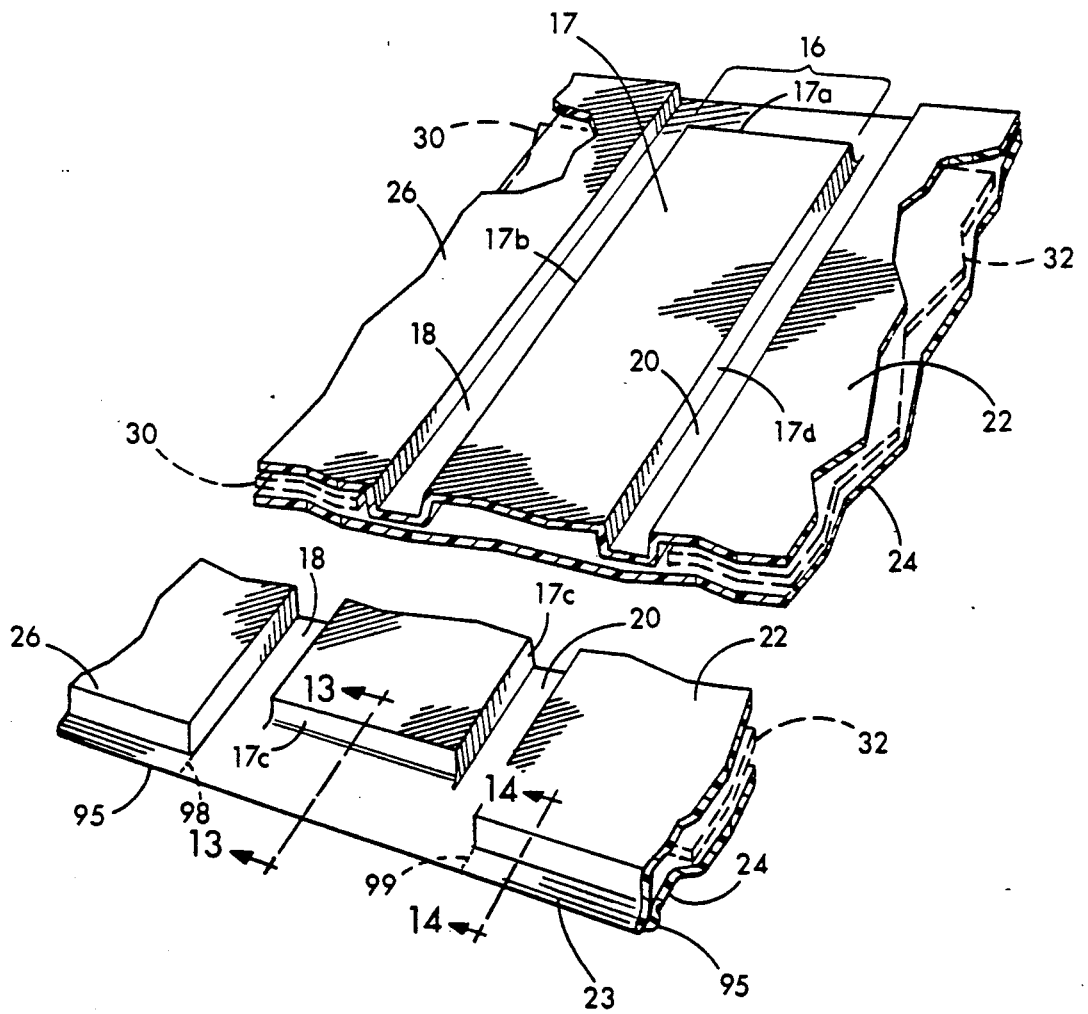
FIG. 4 is a greatly enlarged perspective view of the upper portion of the spine of the album and surrounding material.

As shown in FIGS. 2–4, there is provided between the channel-form hinges 18 and 20 an elevated rectangular plateau 17 having four intersecting vertical side walls 17a–17d to define a centrally located box-like frame aligned in the area of the spine 16 to help keep the spine 16 flat. The box-like frame 17 between the channels 18 and 20 helps to rigidify the spine 16 and to make the hinges 18 and 20 more effective in making precise bends to provide a clean, tailored look for the album. The plateau 17 is thus an upwardly deflected, downwardly opening structure having a tray-like appearance as seen from below and having side walls 17b and 17c on either side of a central wall, all of which are thermoformed upwardly from the plane of the surrounding hinge portions 18, 20 of the tray sheet 22. It can also be seen that the side walls 17b and 17c of the plateau 17 comprise inner walls of the channel-form hinges 18 and 20. The rectangular plateau 17 functions effectively even though no cardboard is provided in the spine area. Sheets of cardboard such as those indicated at 30 and 32 can be provided, if desired, in the cover areas. As shown in the FIG. 4, the vertical side walls 17b and 17c of the plateau 17 define the inner edges of the channel-form hinges 18 and 20.

The side walls of the pocket 28 are provided with finger-access recesses 84 of known arcuate shape. In corresponding positions in the side walls of the opposite pocket 26 (the pocket of the front cover 12) are provided a pair of aligned outwardly projecting tabs 82 (projecting upwardly toward the observer in FIG. 2) which, when the album is closed, are aligned to extend into the finger-access recesses 84. It was discovered that the tabs 82 help to keep the walls of the pockets in alignment and are quite effective in strengthening the album against buckling under pressure when the covers 12 and 14 are forced toward one another.

The hinges will now be described in more detail in connection with FIGS. 4–8. Folding of the album covers at each edge of the spine is accomplished by means of channel-form hinges 18, 20 located entirely within the sheet material of the tray sheet 22. Each channel-form hinge 18, 20 is formed in the tray sheet by providing one or more bends or folds in the tray sheet 22. It should be noted that the sheet material within each of the channels 18 and 20 is uniform in thickness and that the thickness of the sheet stock at the hinge is substantially the same as the material of the surrounding tray sheet 22. For example, as seen in cross-section, the sheet stock material of a single channel proceeding from left to right bends downwardly then upwardly at the bottom of the channel and horizontally at the right edge of the channel. This provides a furrow or channel formed from a sheet of material having a constant thickness throughout. It can be seen in FIG. 4 that the channel-form hinges 18 and 20 extend all the way to the top seal 23a when a top seal is provided. Similarly, as shown in FIG. 2, the hinges 18, 20 extend all the way to the bottom portion of the edge seal 23.

Figure 6:
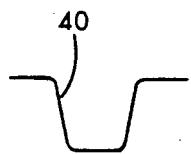
FIG. 6 is a cross-sectional view of one form of angled channel-form hinge.
Figure 7:
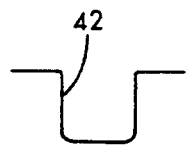
FIG. 7 is a cross-sectional view of a U-shaped channel-form hinge.
Figure 8:
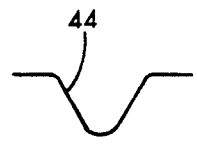
FIG. 8 is a cross-sectional view of a V-shaped channel-form hinge.

The hinges can have a variety of shapes. For example, as shown in FIG. 6, the channel 40 has an angled trough shape in which the width of the channel diminishes proceeding toward the bottom. FIG. 7 is similar but the width of the trough 42 is constant from top to bottom. In FIG. 8 is shown a trough 44 having a V-shape with a radius at the bottom.

Figure 5:
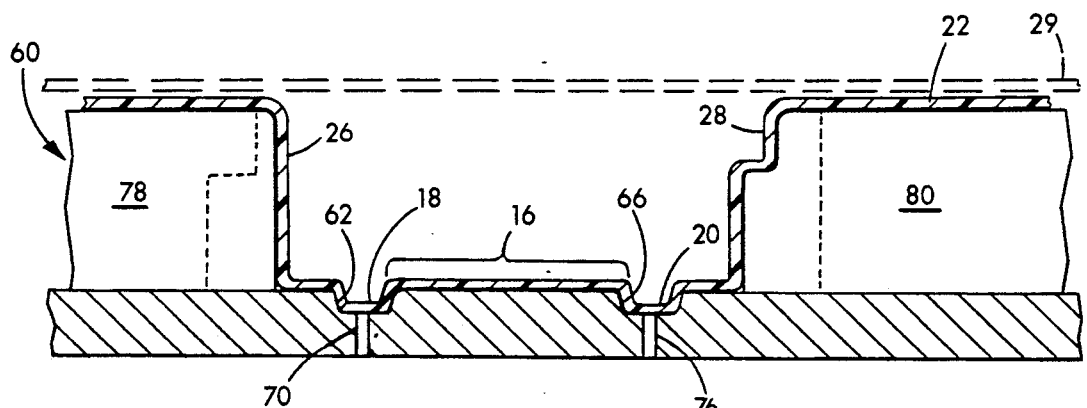
FIG. 5 is a semi-diagrammatic vertical sectional view showing the forming of the album tray.

A preferred method of manufacturing the hinges 18, 20 will now be described with reference to FIGS. 5 and 9. To begin the process, the relatively stiff self-supporting plastic tray sheet 22 is positioned horizontally as shown by dotted lines in FIG. 5 above a molding form or die 60. The tray sheet 20 is then heated uniformly to render it thermoformable. The molding form 60 includes two raised pocket-forming molds 78 and 80. Communicating through the form 60 are two channels 62 and 66 having vacuum ports 70 and 76. Other vacuum ports (not shown) are provided to draw the sheet 22 downwardly into the tray-forming molds 78 and 80. As a vacuum is applied through the ports 70 and 76, the soft, hot plastic is drawn to the bottom of the forming channels 62 and 66 so that it conforms precisely to the inside contour of the molding form 60 and is deflected upwardly between the channels 18 and 20 to form the plateau 17. If desired, pressure can be applied to the sheet 22 from above to force it into the forming channels 62 and 66. It will be seen as a result that the tray sheet stock 22 has a uniform thickness throughout the area of the hinges 18 and 20. The formed tray sheet 22 is then removed from the mold 60 and the soft, supple cover stock sheet 24 is sealed to at least some edges of the tray sheet 22 along seal lines 23 or 23a as the case may be.

Figure 11:
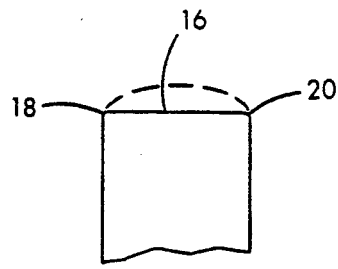
FIG. 11 is a cross-sectional view taken on line 11—11 of FIG. 1 on an enlarged scale.

Refer now to FIGS. 10 and 11. When the album is closed, the supple cover stock material 24 will conform smoothly to the contours of the hinges 18 and 20 which act together as a stiff backbone stretching the soft conformable cover stock material 24 over it to serve as an underlying framework. This provides a neat, tailored and attractive appearance with precise bends at each of the hinges 18, 20 and a flat spine 16 between the hinges. In addition, because the hinges 18, 20 are formed entirely within the tray sheet 22, the hinges 18, 20 will not be compressed to a thin cross-section as described for example in U.S. Pat. Nos. 4,641,750 and 4,784,264.

Figure 12:
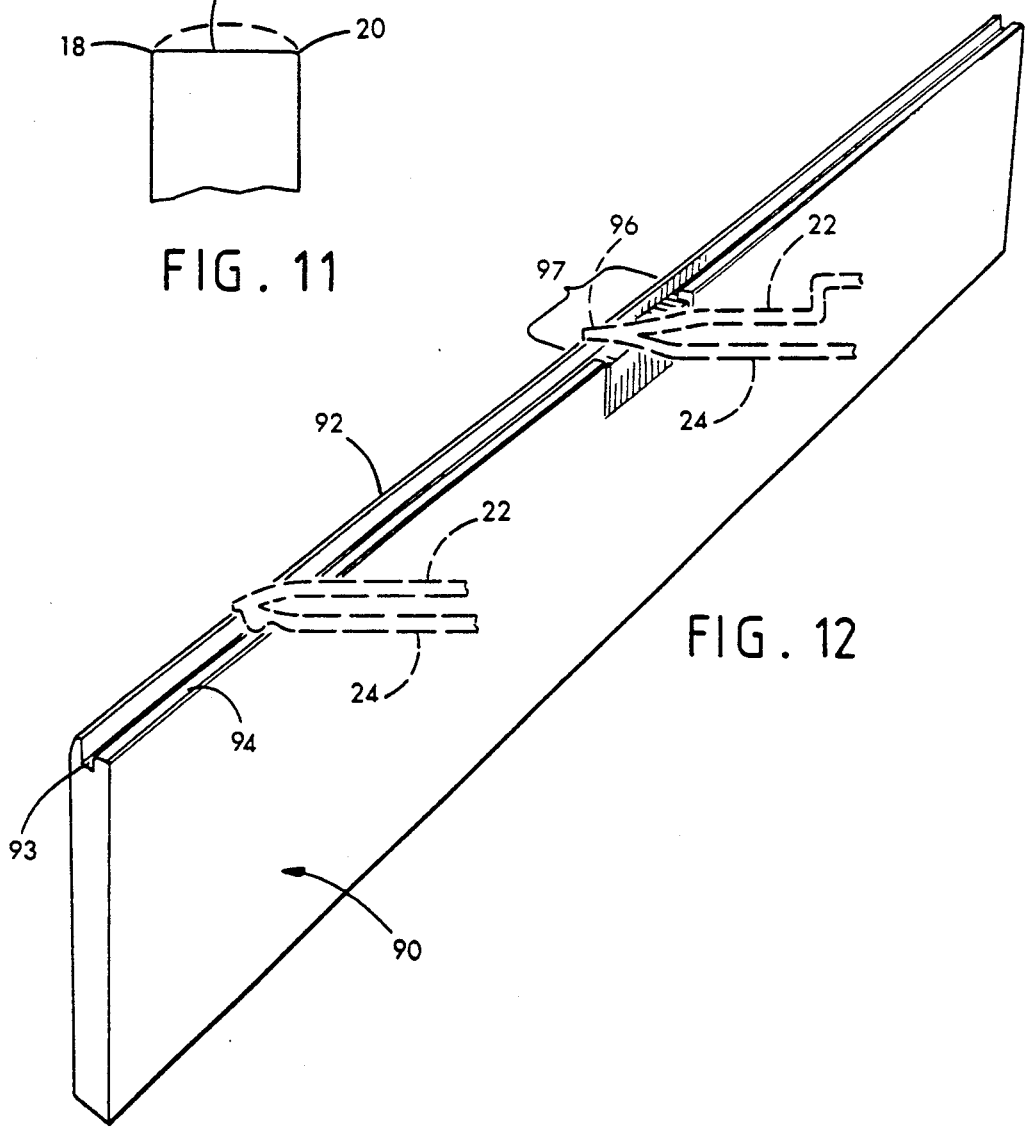
FIG. 12 is a perspective view of a heat seal/cutter bar used for forming the top and bottom edge seals of the album with cross-sections of sealed album material superimposed thereon.
Figure 13:
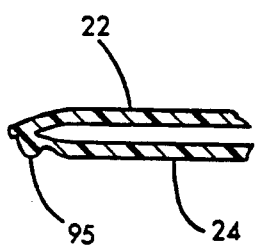
FIG. 13 is an enlarged cross-sectional view taken on line 13—13 of FIG. 4.
Figure 14:
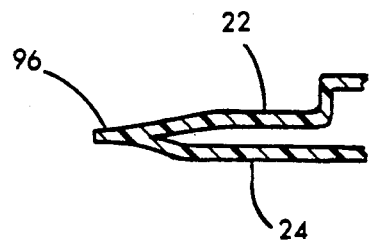
FIG. 14 is an enlarged cross-sectional view taken on line 14—14 of FIG. 4.

The top and bottom seals 23a and 23 include a feather seal (FIG. 13) formed in the spine area 16 and a bead seal (FIG. 14) formed on either side of the spine in the cover area. The end seals can be formed, for example, by means of a heated cutting and sealing bar 90 (FIG. 12) having a cutting bar portion 92 adapted to both seal and cut the sealed edges of the sheets 22, 24. To form the seals 23, the sealing bar or rule 90 is pressed onto the sheets 22, 24 to force them against a solid metal sheet or backing (not shown). The sealing bar or rule 90 is provided with a longitudinally extending recess 93 with an adjacent projection 94 which cooperates with the bar 92 to form a bead 95 where the sheets 22, 24 seal together in the cover area. However, the projection 94 is removed at the center of the sealing bar 90 in alignment with the spine 16 so that a feathered seal 96 is formed in the central area 97 of the sealing rule 90 where the spine 16 is located. The beads 95 thus terminate at 98 and 99 (FIG. 4) in alignment with the outer edges of the channel-form hinges 18, 20 as shown in FIG. 4. The provision of a feather seal 96 in the spine area 16 and the bead seal 95 in the cover portions of the album has been found highly effective in reducing the tendency for cracks to form at the ends of the hinges 18, 20 during the life of the album. In this way, the ends of the hinges 18, 20 are made stronger and more resistant to breakage.

The present albums close more reliably with less tendency for stress remaining in the hinges to cause the album to pop open. If desired, the invention can be provided with an open center in the tray walls adjacent the spine to display the cassette title through the spine as described in U.S. Pat. No. 4,784,264.

Manufacture of the present invention is also greatly facilitated because there is no need for a sheet of release paper formerly placed between the inner and outer album sheets when hinges were formed by means of heated stamping bars to provide the spine rule.

Many variations of the present invention within the scope of the appended claims will be apparent to those skilled in the art once the principles described herein are understood.

What is claimed is:

1. A book-style cassette album comprising, front and rear covers connected by a spine, said album including a stiff, self-supporting thermoformed tray sheet extending the height and breadth of both the front and rear covers and across the spine area, at least one of the covers including a tray comprising a portion of the tray sheet having an inwardly deflected wall at least in part surrounding a central pocket adapted to receive a cassette to be held in the album, a pair of parallel vertically disposed laterally spaced apart channel-form hinges within the tray sheet, one such hinge at each edge of the spine and extending proximate to the top and bottom edges of the tray sheet to define fold lines between the spine and each of the covers, each of said channel-form hinges being uncompressed such that the tray sheet is of substantially uniform thickness throughout and each channel has substantially the same thickness as the surrounding material of the tray sheet, a cover sheet formed from a soft, supple nonself-supporting sheet of plastic material sealed to at least some of the edges of the tray sheet and being unsealed to the tray sheet at the channel-form hinges, the supple cover stock conforming to the underlying hinges which act as a stiff framework over which the cover sheet extends when the album is closed to present an attractive tailored appearance along each hinge, the cover sheet is sealed to the tray sheet by means of a peripheral seal along at least one end of the spine including a tapering feather seal that tapers toward the aligned and sealed edges of the portions of the sheets aligned with the spine area between the hinges and a beaded seal is provided between the tray sheet and the cover sheet on each side of the hinges in the area of the front and rear covers to improve crack resistance of the album at the adjacent ends of the hinges.

2. A book-style cassette album comprising, front and rear covers connected by a spine, said album including a stiff, self-supporting thermoformed tray sheet extending the height and breadth of both the front and rear covers and across the spine area, a pair of parallel vertically disposed laterally spaced apart channel-form hinges within the tray sheet, one such hinge at each edge of the spine and extending proximate to the top and bottom edges of the tray sheet to define fold lines between the spine and each of the covers, each of said channel-form hinges being uncompressed such that the tray sheet is of substantially uniform thickness throughout and each channel has substantially the same thickness as the surrounding material of the tray sheet, a cover sheet formed from a soft, supple nonself-supporting sheet of plastic material sealed to at least some of the edges of the tray sheet and being unsealed to the tray sheet along the channel-form hinges, the supple cover stock conforming to the underlying hinges which act as a stiff framework over which the cover sheet extends when the album is closed to present an attractive tailored appearance along each hinge, the tray sheet has a second pocket, the first pocket is in the front cover and the second such pocket is in the rear cover, said pockets having first and second inwardly deflected side walls, respectively, the first side wall has finger-access recesses therein and the second side wall has outwardly projecting tabs that extend into the recesses in said first side wall when the album is closed to strengthen the album against buckling when the covers of the album are pressed toward one another.

3. The album of claim 1 wherein the elevated plateau portion of the tray sheet is rectangular and is located centrally in the spine of the album.

4. The album of claim 1 wherein the plateau is an upwardly deflected, downwardly opening structure having a tray-like appearance as seen from below and having side walls and a central wall thermoformed upwardly from the plane of the surrounding hinge portions of the tray sheet.

5. The album of claim 1 wherein the side walls of the plateau comprise inner walls of the channel-form hinges.

6. A book-style cassette album comprising, front and rear covers connected by a spine, said album including a stiff, self-supporting thermoformed tray sheet extending the height and breadth of both the front and rear covers and across the spine area, both of the covers including a tray comprising a portion of the tray sheet having inwardly deflected first and second side walls at least in part surrounding first and second pockets adapted to receive a cassette to be held in the album, a pair of parallel vertically disposed laterally spaced apart channel-form hinges within the tray sheet, one such hinge at each edge of the spine and extending proximate to the top and bottom edges of the tray sheet to define fold lines between the spine and each of the covers, each of said channel-form hinges being uncompressed such that the tray sheet is of substantially uniform thickness throughout and each channel has substantially the same thickness as the surrounding material of the tray sheet, said tray sheet having an elevated plateau defining a rectangular frame located in a spine portion of the tray sheet to assist in keeping the spine flat, a cover sheet formed from a soft, supple nonself-supporting sheet of plastic material sealed to at least some of the edges of the tray sheet and being unsealed to the tray sheet along the channel-form hinges, the supple cover stock conforming to the underlying hinges which act as a stiff framework over which the cover sheet extends when the album is closed to present an attractive tailored appearance along each hinge, the first side wall has finger-access recesses therein and the second side wall has outwardly projecting tabs that extend into the recesses in said first side wall when the album is in a closed position to strengthen the album against buckling when the covers of the album are pressed toward one another.

7. The album of claim 1 wherein the tray sheet is formed from a thermoformable plastic resin, said tray has channels corresponding to the position of the edges of the spine of the album, the tray sheet is also deflected upwardly between the channels to form the plateau to thereby define said channel-form hinges with the plateau between them, and the tray sheet is sealed along at least some of its edges to the soft cover sheet.

8. A book-style cassette album comprising, front and rear covers connected by a spine, said album including a stiff, self-supporting thermoformed tray sheet extending the height and breadth of both the front and rear covers and across the spine area, at least one of the covers including a tray comprising a portion of the tray sheet having an inwardly deflected wall at least in part surrounding a central pocket adapted to receive a cassette to be held in the album, a pair of parallel vertically disposed laterally spaced apart channel-form hinges within the tray sheet, one such hinge at each edge of the spine and extending proximate to the top and bottom edges of the tray sheet to define fold lines between the spine and each of the covers, each of said channel-form hinges being uncompressed such that the tray sheet is of substantially uniform thickness throughout and each channel has substantially the same thickness as the surrounding material of the tray sheet, said tray sheet having an elevated plateau defining an upwardly deflected, downwardly opening rectangular frame located in a spine portion of the tray sheet including four intersecting side walls to assist in keeping the spine flat, a cover sheet formed from a soft, supple nonself-supporting sheet of plastic material sealed to at least some of the edges of the tray sheet and being unsealed to the tray sheet along the channel-form hinges, the supple cover stock conforming to the underlying hinges which act as a stiff framework over which the cover sheet extends when the album is closed to present an attractive tailored appearance along each hinge, the cover sheet is sealed to the tray sheet by means of a peripheral seal along at least one end of the spine including a tapering feather seal aligned with the spine area between the hinges and the beaded seal on each side of the hinges in the area of the front and rear covers to improve the crack resistance of the album at the adjacent ends of the hinges.

* * * * *